United States Patent Office

3,404,101
Patented Oct. 1, 1968

3,404,101
CATALYST FOR SELECTIVE HYDROGENATION OF DIOLEFINIC AND ACETYLENIC HYDROCARBONS
Edouard Weisang, Jean-Louis Weill, and Philippe Engelhard, Le Havre, France, assignors to Societe Anonyme: Compagnie Francaise de Raffinage, Paris, France, a French corporation
No Drawing. Filed June 3, 1965, Ser. No. 461,188
Claims priority, application France, June 5, 1964, 977,256
10 Claims. (Cl. 252—465)

ABSTRACT OF THE DISCLOSURE

A process is provided for the selective hydrogenation of diolefins and acetylenic hydrocarbons in a charge of olefinic hydrocarbons by passing the charge over a specific catalyst comprised of a refractory oxide support having an absorbing surface of at least 30 square meters per gram and into which surface is absorbed chromic anhydride and nickel carbonate in an amount equal to between 0.5% and 8% of the support (calculated as in metallic form), and in which the ratio of chromium to nickel is between 1.5 and 2 chromium to 1 nickel, said impregnation being carried out by immersing the refractory support in an aqueous solution of chromic anhydride and nickel carbonate in which the combined concentration thereof is less than 15 grams per liter.

---

The present invention is concerned with the purification of olefin charges. It has especially for its objects: selective hydrogenation catalysts of diolefins and acetylene hydrocarbons formed of compounds of chromium and nickel deposited on a support of refractory oxide, the method of manufacture of these catalysts and a method of use of the catalysts according to the invention for the selective hydrogenation of diolefins and acetylene hydrocarbons in mixtures which contain them together with other hydrocarbons.

It is of great importance to eliminate as completely as possible the impurities constituted by diolefins and acetylene hydrocarbons contained in olefin charges, especially in olefins intended for linear polymerization over catalysts of the Ziegler type since, even in very small quantities, diolefins, like acetylene hydrocarbons, inhibit the catalytic reactions of polymerization, and the overall content of these two categories of hydrocarbons must be very small, in certain cases less than 5 p.p.m.

One method of purifying olefin charges consists of distilling them in narrow fractions, then in extracting by a solvent the diolefins and/or the acetylene hydrocarbons of each fraction. But the most economic method consists of hydrogenating the diolefin and/or acetylene compounds in the charge without touching the olefins. It is necessary to operate in the presence of highly selective catalysts, that is to say which are capable of hydrogenating the diolefins and the acetylene, even in the state of traces, practically without saturating the olefins.

Such catalysts have already been produced industrially from metals known for their hydrogenating activity; this is the case for example of molybdenum and cobalt, deposited on a support of alumina, or alternatively of nickel, copper, alone or in mixtures with other metals, or also of the noble metals such as platinum and palladium. Over these catalysts, the required selectivity can be obtained, either by increasing the hourly spatial speed, or by controlling the activity of the catalyst by partially poisoning it with sulphur.

In order to overcome these obligations, it is known to employ, amongst others, in the selective hydrogenation of diolefins and acetylene hydrocarbons, catalysts of chromium and nickel deposited on a calcined support, composed of alumina and/or of silica.

Although the selectivity of chromium-nickel catalysts is higher than that of the catalysts previously employed, there still takes place a certain hydrogenation of the double ethylene bonds, especially when the diolefin and/or acetylene impurities are in small proportions in the charge. In addition, these catalysts remain sensitive to variations of output of charge which take place during the operation; thus, a reduction of this output involves the hydrogenation of a substantial part of the olefins which it is desired to purify.

On the contrary, the chromium and nickel catalysts in accordance with the present invention, deposited on a support of refractory oxide, are capable of eliminating almost completely, by hydrogenation, the diolefin and acetylene hydrocarbons present, even in the state of traces, in an olefin charge, without thereby saturating the double ethylene bonds. These new catalysts retain the same selectivity just as well at hourly spatial speeds of 500 v./v./hr. as at 5,000 v./v./hr., and remain active at temperatures as low as 150° C.

The applicants have in fact observed that while the activity of the chromium and nickel catalysts depends on the quantity of these metals deposited on the support, the selectivity itself depends on the distribution of the chromium and nickel compounds over the absorption surface.

By the term "absorption surface" in this description is meant the real active surface per gram found by the method of "Brunauer Emmet and Teller" (B.E.T.), that is to say by measuring the quantity of nitrogen absorbed at $-195°$ C. on the support, previously de-gasified at 250° C., for 2 hours at a pressure of $10^{-5}$ mm. of mercury or less, and by considering that the surface of the section of the nitrogen atom is 16.2 $A.^2$ (in the liquid state).

For example, experiments are carried out on a gaseous mixture containing acetylene with two catalysts—designated below by A and B—which have approximately the same composition but have different distributions of chromium and nickel.

Catalyst A.—The content of chromium plus nickel, estimated in metallic form, is 4.24% by weight; the compounds of the chromium and nickel are distributed uniformly over the entire surface of the support, in this case active gamma alumina.

Catalyst B.—The content of chromium plus nickel is 5.01% by weight, but the compounds of chromium and nickel are accumulated on the outer surface of the support and do not cover the inner surface. The support is also active gamma alumina.

The composition of the gaseous mixture used for the tests varied within the following limits:

| | | |
|---|---|---|
| $H_2$ | percent | 10–12.5 |
| Ethylene | do | 10.5–11.7 |
| Acetylene | p.p.m. | 960–1,150 |
| CO | percent | 3–3.5 |
| $CO_2$ | p.p.m. | 50–150 |

The results of the test, carried out at 180° C. with hourly spatial speeds varying from 500 to 2,500 v./v./hr. are given in Table I below:

TABLE I

| | Temperature, 180° C. | | | |
|---|---|---|---|---|
| Hourly spatial speeds | 1,000 | 1,500 | 2,000 | 2,500 |
| Catalyst A: | | | | |
| Hydrogenated ethylene, percent | 2 | 2 | 2 | 1 |
| Residual acetylene, p.p.m. | 0 | 0 | 0 | 0 |
| Catalyst B: | | | | |
| Hydrogenated ethylene, percent | 16 | 16 | 15 | 12 |
| Residual acetylene, p.p.m. | 0 | 0 | 0 | 0 |

It can be seen from Table I that over the catalyst B, large quantities of ethylene are hydrogenated, while over catalyst A, the ethylene is only hydrogenated in much smaller quantities. It is also observed that the acetylene is completely eliminated over both. A similar observation is made at 150° C.

The previous test, repeated several times over various charges of catalysts of type A and type B, of which the content of active compounds of chromium plus nickel is varied, gave similar results, namely higher selectivity of the catalyst of type A as compared with those of type B.

However, the catalysts of type A lose their selectivity if the quantity of active compounds, estimated in the for mof metallic chromium and nickel, adsorbed over the adsorption surface exceeds a certain value, which is approximately 0.2 milligram per square metre of the said surface. In addition, in order to have sufficient activity, the content of chromium plus nickel must be at least 0.02 mg. per square metre.

In preparing catalysts by impregnation of a support with a solution of chromic anhydride and nickel carbonate, the applicants have observed, in a completely unexpected manner, that irrespective of the duration of the impregnation, the catalysts prepared with solutions containing more than 15 grams per litre of chromium plus nickel, estimated in the metallic form, were of type B, whereas below this value, catalysts of type A were obtained. They also observed that the impregnation of a support with solutions containing less than 1.25 grams per litre gave catalysts having too little activity, in which the content of chromium plus nickel is less than 0.02 mg./sq.m. of the absorption surface.

From all these tests, the applicants have deduced that it was possible to hydrogenate the diolefin and/or acetylene hydrocarbons contained in olefin charges with a high selectivity, by employing catalysts of the type A defined above, which can be obtained by limiting the concentration of the solution with which the support is impregnated.

(1) The invention has therefore for its objects:

By way of new industrial products, selective hydrogenation catalysts of diolefin and/or acetylene hydrocarbons, the said catalysts being of the type containing active compounds of chromium and nickel deposited on a support of refractory oxide, and being characterized in that the said active compound, estimated in the metallic form, are distributed uniformly over the whole absorption surface of the support at the rate of 0.02 to 0.2 milligram per square metre.

(2) A method of manufacture of the said catalysts consisting of impregnating a support with an aqueous solution of soluble salts of chromium and nickel, the concentration of which, calculated in the form of metallic chromium and nickel, is less than 15 grams per litre until the support has absorbed from 0.5 to 8% of its weight of active compounds of chromium plus nickel, estimated in the metallic form.

(3) A method of selective hydrogenation of diolefin and/or acetylene hydrocarbons contained in a charge of olefin hydrocarbons characterized in that the hydrogenation is effected over the catalysts in accordance with (1) above or prepared in accordance with (2) above, and in that the operation is carried out at a temperature comprised between 100 and 300° C. with hourly spatial speeds of 500 to 5,000 v./v./hr. and at a pressure of 5 to 70 atmospheres.

In the catalysts in accordance with the invention, the content of compounds of chromium and nickel is such that the chromium-nickel ratio by weight is about 1.80 grams of chromium per gram of nickel. However, the selectivity and activity of the catalysts remains good if there is an excess or deficit of nickel; thus, the invention extends to catalysts in which the ratio of chromium to nickel is comprised between 1.5/1 and 2/1 by weight.

The substance utilized as a support is constituted by alumina, silica or mixtures of alumina and silica. A support which is particularly suitable is an alumina essentially constituted by one phase of so-called gamma alumina. The support should preferably have an absorption surface of at least 30 sq.m./g.

As the specific surface of the supports employed is at least 30 sq.m./g. and as the catalysts only possess sufficient activity if the active compounds cover the surface at the rate of at least 0.02 mg./sq.m., the minimum content by weight must therefore be 0.5%, counting the active compounds in the form of metallic chromium and nickel. Although catalysts of very large surface area can be employed and the content of active compounds may increase with the absorption surface without losing selectivity when these compounds are uniformly distributed at a maximum rate of 0.2 mg./sq.m., the applicants have observed that the most selective catalysts had a content of active compounds at most equal to 8% by weight. For selective hydrogenation of acetylene hydrocarbons, catalysts are preferably chosen in which the content of active compounds is comprised between 2 and 6% by weight.

In order to manufacture the catalysts of the invention, the support is previously treated at 500–650° C. in order to eliminate the impurities, after which it is immersed in an aqueous solution containing salts of nickel and chromium with a concentration, counted in the form of metallic chromium and nickel, less than 15 grams per litre. The catalyst thus impregnated is then filtered, dried, made into pastilles and calcined.

For the application of the invention to the selective hydrogenation of diolefins and/or acetylene hydrocarbons and although it is possible to use other soluble salts of chromium and nickel, the catalysts which are at the same time the most active and the most selective were obtained by the applicants by impregnating the support with a solution in water of chromic anhydride and nickel carbonate which were caused to react while hot. The catalysts are active even if the chromium and nickel are not in a stoichiometric proportion of 2 atoms of chromium to 1 atom of nickel; the support can be impregnated with a solution containing an excess or a deficit of nickel carbonate which can amount to 20%. Approximately 1 kg. of support is immersed in 30 to 60 litres of solution at a temperature in the vicinity of ordinary temperature or slightly higher.

The duration of the impregnation must be such that the amount of active compounds deposited on the support is comprised between 0.5 and 8% by weight, preferably 2 to 6%, over the absorption surface, as has been stated above. In order to determine the quantity deposited, the mother solution is analysed before and after the impregnation, and the proportions of chromium and nickel are determined. When the support has adsorbed the desired quantity of active compounds, the impregnation is stopped. The chromium in the hexavalent state can be estimated, for example volumetrically, by titrating in the reverse direction with ferrous sulphate (Mohr's salt) with potassium permanganate; the nickel is estimated by dimethylglyoxime in a slightly ammoniacal medium.

After impregnation, the catalysts are separated from the mother solution and then dried in an oven between 100° and 115° C. for example, until their weight remains constant as a function of time.

The catalysts can then be made into pastilles; for example they are mixed with 3% of aluminium stearate to form cylinders of 3 mm. in height and 3 mm. in diameter.

Finally, they are calcined in a muffle furnace between 420° and 470° C. in an atmosphere of air.

Before their use, the catalysts are advantageously reduced by a current of hydrogen at a temperature comprised between 320° and 370° C. for 4 to 7 hours.

By virtue of the catalysts of the invention obtained by the method described above, diolefin and/or acetylene hydrocarbons contained in very varied charges can be selectively hydrogenated.

By the application of the invention, it is possible to treat gaseous charges resulting from the pyrolysis of petroleum fractions in which there are present, in addition to the olefins: ethylene, propylene, butenes; paraffins, aromatics and the diolefin and acetylene hydrocarbons which it is desired to eliminate. The charges treated may also be cracking effluents and in general effluents of known units, in order to produce unsaturated hydrocarbons in large quantities.

Although the selective hydrogenation process according to the invention can be applied to charges from which there have already been separated the hydrocarbons containing 4 atoms of carbon or more, this separation is not necessary and selective hydrogenation of the diolefins and the acetylenes is obtained, even in the raw gases derived from industrial installations.

The content of diolefin and/or acetylene hydrocarbons in the charge can vary from 100 to 50,000 p.p.m., without the appearance of any substantial difference of activity or selectivity in the catalyst.

The catalysts according to the invention permit hydrogenation to be carried out at temperatures from 120° to 300° C. The rate of hydrogenation increases with the temperature, but it is observed that when this temperature exceeds 300° C., the selectivity of the catalyst for the hydrogenation of diolefins and acetylene hydrocarbons falls off. On charges which have been freed from hydrogen sulphide, the operation can be effected at temperatures below 180° C. with a good activity of the catalyst, but if the catalyst has been poisoned by sulphur, it can be easily regenerated by operating at a temperature equal to or higher than 200° C.

When the charge contains diolefins, the hydrogenation temperature should preferably be higher than 200° C., in order that these latter may be completely eliminated, but this has no effect on the selectivity of the catalyst.

The hourly spatial speed is comprised between 500 and 5,000 v./v./hr. This hourly spatial speed is chosen as a function of the temperature; the speed will be higher as the temperature increases, as a function simultaneously of the content of acetylene and/or diolefin hydrocarbons in the charge (the conversion diminishing if the speed is increased) and of the desired purity of the product.

The pressure is higher than atmospheric pressure; it is comprised, for example, between 5 and 30 atmospheres.

The invention is further illustrated by the examples given below which have no limitative nature.

In Examples I, II and III, the charge to be treated has the following composition:

TABLE II

| | |
|---|---|
| Acetylene, p.p.m. | 960 |
| $CO_2$, p.p.m. | 180 |
| $N_2$, percent | 8.2 |
| CO, percent | 2.7 |
| $H_2$, percent | 11.2 |
| Methane, percent | 32.6 |
| Ethane, percent | 17.4 |
| Ethylene, percent | 10.8 |
| Propane, percent | 4.5 |
| Propylene, percent | 10.6 |
| Isobutane, percent | 0.7 |
| Butane, percent | 0.25 |
| Butenes, percent | 0.8 |
| Pentenes, percent | 0.1 |
| Isopentane, percent | 0.15 |
| Pentane, percent | 0.0 |

The hydrogenation pressure is 10 bars.

Example I

A solution of $NiCr_2O_7$ is prepared by the action of chromic anhydride on nickel carbonate at 80° C., following the reaction:

$$2CrO_3 + NiCO_3 \rightarrow NiCr_2O_7 + CO_2$$

This solution of $NiCr_2O_7$ contains 0.948 gram per litre of nickel and 1.754 grams per litre of chromium, the chromium and the nickel being calculated in the metallic form.

A gamma alumina is treated for 3 hours, having a surface of 343 sq.m./gram at 600° C. The alumina thus treated is then impregnated with the said solution of nickel bichromate ($NiCr_2O_7$) for 15 hours.

The catalyst is then filtered and dried at 110° C. and it is calcined in a muffle furnace at 440°±10° C., in the presence of air.

The catalyst C-1 thus obtained contains 3.91% by weight of chromium plus nickel; it is pre-treated with a current of hydrogen at 350° C. for 6 hours with an hourly spatial speed of 200 v./v./hr.

50 cu.cm. of this catalyst C-1 are employed for treating the charge, the composition of which has been given in Table II. The results of this treatment are given in Table III.

Example II

A catalyst C2 is prepared in the same manner as the catalyst C-1, but the solution of nickel bichromate contains 2.428 grams per litre of nickel and 4.374 grams of chromium, the chromium and the nickel being estimated in the metallic form.

The catalyst C2 obtained contains 4.53% by weight of chromium plus nickel, estimated in the metallic form.

In the same way, this catalyst C2 is pre-treated at in Example I; the results of the selective hydrogenation of the same charge, carried out over the catalyst C2, are given in Table III.

Example III

A catalyst C3 is prepared as in the two previous examples, but with a solution of nickel bichromate containing 4.908 grams per litre of nickel and 8.926 grams per litre of chromium, calculated in the metallic form.

This catalyst C3 contains 4.7% by weight of chromium plus nickel, calculated in the metallic form.

In the same way as the catalysts C-1 and C2, it is pre-treated with hydrogen as described in Examples I and II.

The results of the selective hydrogenation carried out over this catalyst are given in Table III.

less than 15 grams per liter, allowing said support to remain immersed in said aqueous solution until it becomes

TABLE III

| Catalyst | | V./v./hr. | T=150° C. | | | | T=180° C. | | | |
|---|---|---|---|---|---|---|---|---|---|---|
| | | | 1,000 | 1,500 | 2,000 | 2,500 | 1,000 | 1,500 | 2,000 | 2,500 |
| C-1 | Hydrogenated C₂H₄, percent | | 10 | 9 | 3 | 0 | 3 | 0 | 0 | 0 |
| | Residual C₂H₂, p.p.m | | 0 | 0 | 0 | .5 | 0 | 0 | 0 | 0 |
| C2 | Hydrog. C₂H₄, percent | | 0 | 0 | 0 | 0 | 5 | 0 | 0 | 0 |
| | Residual C₂H₂, percent | | 0 | 0 | 0 | 5 | 0 | 0 | 0 | 0 |
| C3 | Hydrog. C₂H₄, percent | | 10 | 5 | 4 | 2 | 8 | 7 | 3 | 2 |
| | Residual C₂H₂, p.p.m | | 0 | 0 | 0 | 5 | 0 | 0 | 0 | 0 |

These examples show that over a large range of spatial speed, the catalysts according to the invention have a very good selectivity and that their activity enables them to be used, even at low temperatures. Over each of the catalysts C-1, C2 or C3, it is possible to hydrogenate all the acetylene hydrocarbons of a charge coming from an industrial unit, without hydrogenating ethylene, and it is possible to vary the hourly spatial speed by 1000 v./v./hr. without altering the selectivity.

Example IV

The olefin charge to be purified contains 0.95% of propadiene, 4.5% of butadiene and 2440 p.p.m. of acetylene hydrocarbons.

The catalyst employed is the same as in Example I. The hydrogenation is effected at 220° C. with a spatial speed of 500 v./v./hr. The results are shown on Table IV below.

TABLE IV

| | Charge | 500 v./v./hr. |
|---|---|---|
| Acetylenes, p.p.m | 2,440 | 0 |
| Methane, percent | 36.9 | 36.6 |
| Ethane, percent | 10.4 | 10.7 |
| Ethylene, percent | 36.5 | 36.2 |
| Propane, percent | 0.5 | 0.5 |
| Propylene, percent | 17.7 | 18 |
| Butene-1, percent | | 1.17 |
| Butene-2 cis, percent | 0.02 | 0.63 |
| Butene-2 trans, percent | | 2.76 |
| Propadiene, percent | 0.95 | 0.0 |
| Butadiene, percent | 4.57 | 0.0 |

If it is desired to operate at a spatial speed of 1000 v./v./hr., the temperature must be increased to 230° C. in order to eliminate the diolefins and the acetylene hydrocarbons. Under these conditions, the olefins are absolutely not hydrogenated.

It can be seen from this example, that the catalysts according to the invention permit the complete purification of olefin charges which contain at the same time diolefins and acetylene hydrocarbons, without the olefins being saturated, although the treatment temperature must be higher than 200° C.

What we claim is:

1. In a method for producing a catalyst useful in the selective hydrogenation of diolefins and acetylene hydrocarbons contained in a charge of olefin hydrocarbons, the steps which comprise immersing a refractory oxide catalytic support consisting essentially of gamma alumina having an absorbing surface of at least 30 m.²/g. in an aqueous solution of soluble salts of chromium and nickel in which the concentration of chromium and nickel salts is less than 15 grams per liter, allowing said support to remain immersed in said aqueous solution until it becomes impregnated with the active compounds of said chromium and nickel salts in an amount between 0.5% and 8% of the weight of said support with said percentages being calculated as the metallic form of said salts.

2. A method as described in claim 1 in which the said catalyst, after impregnation, is calcined at between 420° C. and 470° C. in an atmosphere of air.

3. A method as described in claim 1 in which said active compounds of chromium and nickel absorbed into the surface of said support are in the ratio of between 1.5 and 2 chromium to 1 nickel.

4. A catalyst as described in claim 3 in which the content of active compounds, chromium plus nickel, calculated in the metallic form, is comprised between 2 and 6% by weight.

5. A method of manufacture of catalysts as claimed in claim 1 in which the concentration of said aqueous solution is comprised between 1.25 and 15 grams per litre, calculated in metallic chromium plus nickel.

6. A method of manufacture of catalysts as claimed in claim 1, in which said support is impregnated until it has absorbed from 2 to 6% of its weight of active compounds.

7. A method of manufacture of catalysts as claimed in claim 1, in which the impregnation is carried out at ordinary temperature.

8. A method of manufacture of catalyts as claimed in claim 1, in which the impregnation is carried out at a temperature slightly higher than the ordinary temperature.

9. A catalyst for use in the selective hydrogenation of diolefins and acetylene hydrocarbons in a charge of olefin hydrocarbons comprising a support of a refractory oxide having an absorbing surface of at least 30 m.²/g. and having evenly absorbed in the surface thereof active compounds of chromium and nickel calculated in metallic form in an amount equal to between 0.5% and 8% of the said support.

10. A catalyst as described in claim 9 in which the said catalyst, after absorption, is calcined at between 420° C. and 470° C. in an atmosphere of air.

References Cited

UNITED STATES PATENTS

| 2,959,627 | 11/1960 | Fleming et al. | 208—216 |
| 3,155,739 | 11/1964 | Fleming | 260—677 |
| 3,205,281 | 3/1959 | Fleming et al. | 260—677 |

DELBERT E. GANTZ, Primary Examiner.

H. LEVINE, Assistant Examiner.